(12) United States Patent
Fuhrer

(10) Patent No.: US 8,950,986 B2
(45) Date of Patent: Feb. 10, 2015

(54) METHOD FOR PRODUCING AN INTERNAL TOOTHING AND COMPONENT HAVING INTERNAL TOOTHING

(75) Inventor: Kim Fuhrer, Lindau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 452 days.

(21) Appl. No.: 13/497,658

(22) PCT Filed: Sep. 1, 2010

(86) PCT No.: PCT/EP2010/062804
§ 371 (c)(1),
(2), (4) Date: Mar. 22, 2012

(87) PCT Pub. No.: WO2011/039025
PCT Pub. Date: Apr. 7, 2011

(65) Prior Publication Data
US 2012/0183368 A1     Jul. 19, 2012

(30) Foreign Application Priority Data

Sep. 30, 2009   (DE) .......................... 10 2009 045 137

(51) Int. Cl.
*B23F 19/00*   (2006.01)
*B23F 17/00*   (2006.01)
*B23F 19/10*   (2006.01)

(52) U.S. Cl.
CPC ............... *B23F 19/00* (2013.01); *B23F 17/006* (2013.01); *B23F 19/002* (2013.01); *B23F 19/105* (2013.01)
USPC .................................. 409/8; 409/39; 409/51

(58) Field of Classification Search
CPC ................................ B21K 1/30; B23F 17/005
USPC ............ 409/8–10, 31, 33, 38, 34, 39, 50, 51, 409/56; 29/893.3, 893.35, 557
See application file for complete search history.

(56) References Cited

U.S. PATENT DOCUMENTS

| | | | | |
|---|---|---|---|---|
| 3,857,152 A | * | 12/1974 | Wolf | 29/893.35 |
| 4,431,351 A | * | 2/1984 | Fransson et al. | 409/35 |
| 4,565,474 A | * | 1/1986 | Charles | 409/51 |
| 4,947,590 A | * | 8/1990 | Schapp et al. | 451/47 |
| 5,127,256 A | | 7/1992 | Shiga et al. | |
| 5,899,645 A | * | 5/1999 | Garschagen et al. | 409/9 |

FOREIGN PATENT DOCUMENTS

| | | |
|---|---|---|
| DE | 44 10 743 A1 | 10/1995 |
| DE | 37 21 949 A1 | 1/1998 |
| DE | 103 58 229 A1 | 7/2005 |
| EP | 0 446 016 A2 | 9/1992 |
| EP | 1 116 901 A2 | 7/2001 |
| JP | 2000-087993 A | 3/2000 |

* cited by examiner

*Primary Examiner* — Daniel Howell
*Assistant Examiner* — Nicole N Ramos
(74) *Attorney, Agent, or Firm* — Davis & Bujold, PLLC; Michael J. Bujold

(57) ABSTRACT

A method of producing internal gear teeth with deflecting surfaces such that the internal gear teeth are arranged in a component having an end and a longitudinal axis, as well as an end face that is offset relative to the end of the component in the direction of the longitudinal axis. The method comprises the steps of machining the end face of the internal teeth using a conical tool that rotates about a tool axis arranged parallel to the longitudinal axis, the rotating tool first being introduced axially and then moved along a circular path coaxial to the longitudinal axis, and finally being withdrawn parallel to the axis.

5 Claims, 4 Drawing Sheets

METHOD FOR PRODUCING AN INTERNAL TOOTHING AND COMPONENT HAVING INTERNAL TOOTHING

This application is a National Stage completion of PCT/EP2010/062804 filed Sep. 1, 2010, which claims priority from German patent application serial no. 10 2009 045 137.4 filed Sep. 30, 2009.

FIELD OF THE INVENTION

The invention concerns a method for producing internal toothing with deflecting surfaces and a component with internal toothing.

BACKGROUND OF THE INVENTION

Components with internal gear teeth, for example drive teeth or spline-shaft teeth, are brought together in the axial direction with other components such as shafts or spindles that have corresponding external teeth in order to produce an interlock between the two components. While bringing the two components together a so-termed tooth-on-tooth position can occur, so that brining them together in the axial direction is blocked. The two components then have to be rotated relative to one another far enough for the teeth to align with the corresponding tooth gaps, so that the blocking is eliminated. Such rotation of the components makes efficient assembly more difficult and slower. Moreover, there are cases when rotation of the components is not readily possible.

For example, this problem is known in the case of synchronization devices in gearwheel transmissions, where a shifting sleeve with internal gear teeth is pushed over a clutch element with external teeth. To facilitate sliding of the shifting sleeve and clutch element one over the other, at their front ends the teeth are provided with oblique or deflecting surfaces. The production of such deflecting surfaces on internal or external teeth is not problematic when the ends of the teeth are flush with the end faces of the components.

From DE 37 21 949 A1 components with internal and external gear teeth are known, which are chamfered at their front ends. In this case the ends of the teeth have a roof-like edge shape with roof-like guide surfaces extending from a cutting-edge-like ridge. The roof-like edge shape is produced by machining the ends with a profile cutter guided in a straight line or on a curved path, which engages in and cuts out the tooth gaps. This production method does not work when the internal gear teeth are offset inward relative to the end face of the component concerned, i.e. not accessible to a milling cutter of that type.

From EP 1 116 901 A2 a planetary transmission with gearwheels is known, whose ends are chamfered to facilitate assembly. The inclined or deflecting surfaces on the teeth are produced by cold forging, i.e. by means of a forging die that has to be produced for the purpose. The dimensional accuracy and surface quality of gear teeth produced in this way do not satisfy stricter requirements.

SUMMARY OF THE INVENTION

The purpose of the present invention is to propose a method of the type mentioned above, i.e. for the production of "inward-offset" internal gear teeth, with which facilitates assembly when components with internal and external gear teeth are brought together. A further purpose of the invention is to provide a component of the type mentioned earlier, which has deflecting surfaces that allow components with internal and external teeth to be brought together easily.

According to the invention, in a method for producing internal gear teeth in a component it is provided that the end faces of the internal teeth are machined using a conical milling cutter whose rotational axis is orientated parallel to the longitudinal axis of the teeth, the conical milling cutter being guided on a circular path over a defined circumferential angle until a first circumferential position has been reached. Then, the tool is drawn back in the axial direction leaving behind it a machined end face that corresponds to the profile of the conical milling head. In a subsequent process step, after axial re-introduction the conical milling tool is applied along a circular path in the opposite direction to the first circumferential position, so that a cutting edge is formed between the first machined surface and the second machined surface. This cutting edge is located centrally on the end side of a tooth of the internal teeth, and forms a deflecting edge. This produces a roof-like form of the end face of a tooth, with deflecting surfaces falling away from the deflecting edge. The process can be repeated many times in order to provide several teeth at the circumference of the internal gear teeth with such deflecting surfaces and a deflecting edge. Preferably, the method according to the invention is used to produce three teeth, uniformly distributed around the circumference, with deflecting surfaces at the end. With the method according to the invention, internal gear teeth whose ends are offset inwardly in the component can be provided with deflecting surfaces in order to facilitate and speed up assembly when they are brought together.

In a preferred process variant the gear teeth can be made either before or after the machining operation with the conical milling cutter. In this case the teeth can preferably be made by hollowing out or slotting.

According to the invention, in the case of a component with internal gear teeth and an inset end face it is provided that at least one tooth of the internal teeth has deflection surfaces that start from a deflection edge and fall away in the circumferential direction. Preferably, three teeth distributed uniformly around the circumference are provided with deflecting surfaces. This has the advantage that assembly during combination with a component having corresponding external teeth is facilitated and sped up. It is no longer necessary to rotate the two components relative to one another in the event of a tooth-on-tooth position. Thanks to the deflecting surfaces, the component to be combined slides in the circumferential direction and finds its way into the tooth gaps, so enabling axial combination.

BRIEF DESCRIPTION OF THE DRAWINGS

An example embodiment of the invention is represented in the drawing and described in more detail below, whereby further characteristics and/or advantages can emerge from the description and/or the drawings, which show.

DETAILED DESCRIPTION OF THE PREFERRED EMBODIMENTS

Figure 1:
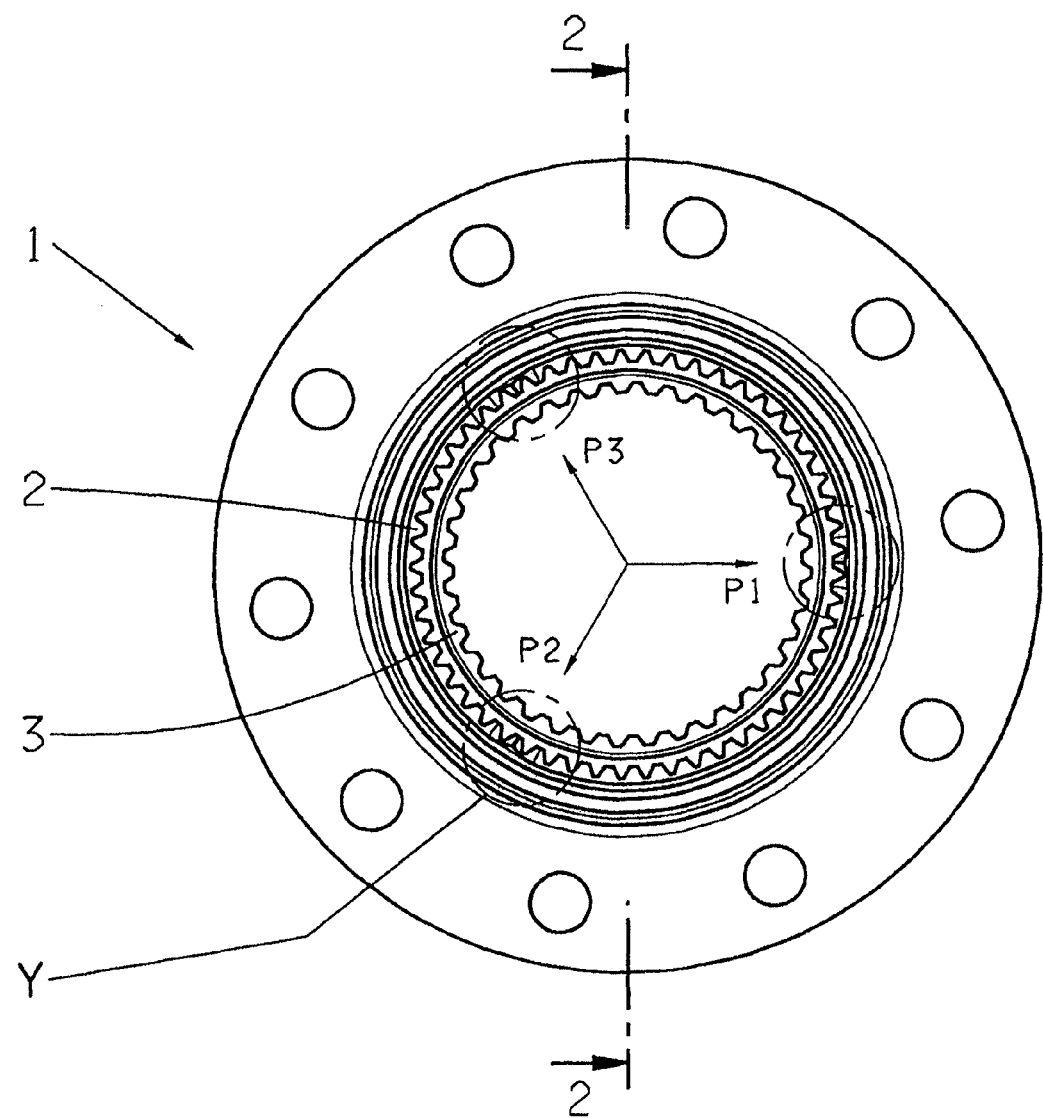
FIG. 1: A view of a component with internal gear teeth, as seen the in the axial direction.

FIG. 1 shows a view in the axial direction, of a component 1 with internal gear teeth 2 having a larger inside diameter and internal gear teeth 3 having a smaller inside diameter. The arrows P1, P2, P3 point to three circled circumferential positions, of which one is shown as a detail Y in FIG. 4.

Figure 2:
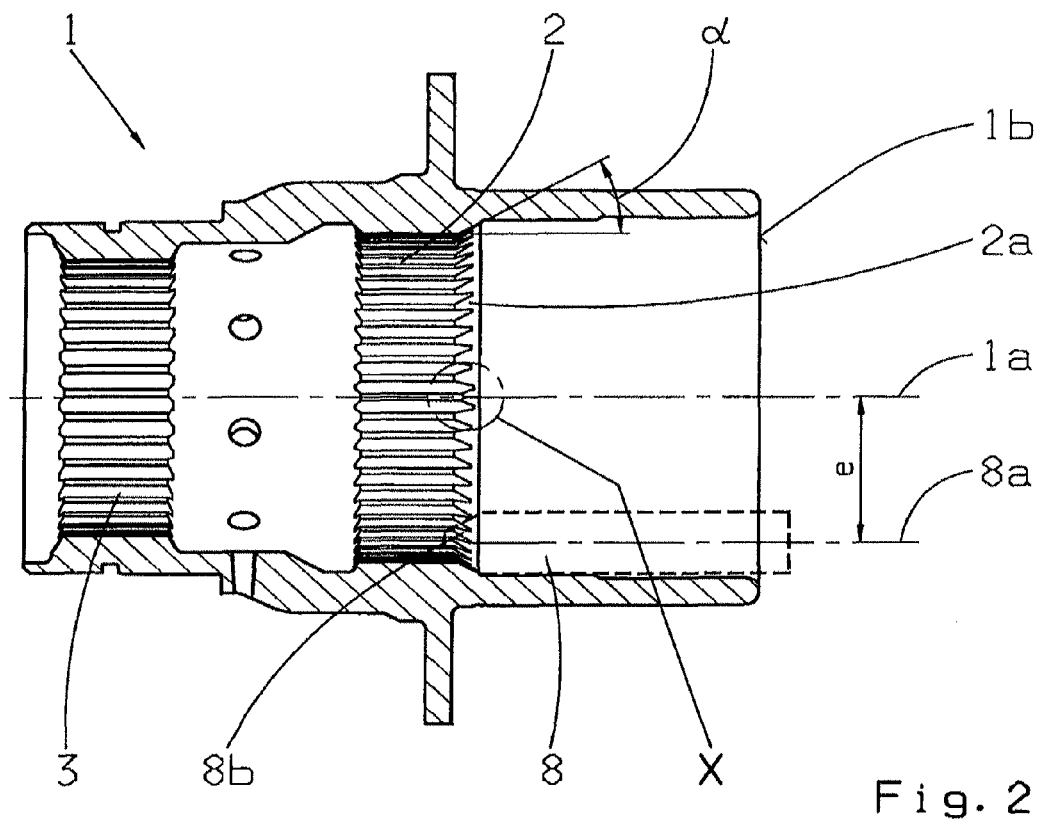
FIG. 2: An axial section of the component in FIG. 1, FIG. 3: A detail X of FIG. 2, FIG. 4: A detail Y of FIG. 1, and FIG. 5: A 3D representation of internal gear teeth with deflecting surfaces on the end face of the internal gear teeth.

FIG. 2 shows a section along the plane 2-2 in FIG. 1, i.e. an axial section through the component 1. The component 1, in the form of a hollow cylinder, has a longitudinal axis 1a and a front end 1b. The internal toothing has a conically shaped end face 2a which is offset inward in the axial direction relative to the front end 1b of the component 1. Not shown in the figure is that the component 1 is to be assembled to a further component which has external gear teeth that correspond to the internal gear teeth 2, 3 so as to form an interlock between the two components. For example, the components to be combined can be used in an automatic transmission of a motor vehicle. To facilitate fitting of the two components, i.e. their axial combination, deflecting elements are provided at the front face 2a of the internal teeth 2, which are shown as a detail X in FIG. 3.

Figure 3:
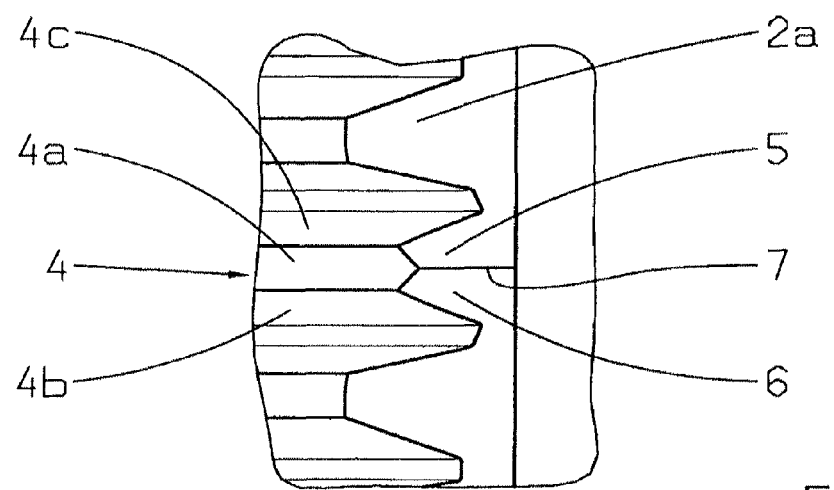

FIG. 3 shows an enlarged section of the internal teeth 2, their front face 2a, and a tooth 4 extending in the axial direction which has a tooth crown 4a and tooth flanks 4b, 4c arranged laterally. The front surface of the tooth 4 is formed by two deflecting surfaces 5, 6 that meet one another along a linear deflecting edge 7, the "roof ridge". The production of the deflecting surfaces 5, 6 will be explained with reference to FIG. 2.

Into the component 1 from its front end 1b is introduced a tool 8 with a rotational axis that extends parallel to the longitudinal axis 1a of the component 1. The tool 8 is in the form of a conical milling cutter, i.e. it has a conically shaped milling head 8b. According to the invention, the deflecting surfaces 5, 6 with the deflecting edge 7 according to the invention are produced by the conical milling tool 8 as described below:

The conical milling tool 8 rotating about its axis 8a is first brought in eccentrically in the axial direction, i.e. offset by a radius e, and is then guided along a circular path of radius e over a defined circumferential angle. Along the path, the conical milling cutter 8, with its rotating, conical milling head 8b, produces a conical end surface 2a whose conic angle α is indicated in the drawing (FIG. 2). When it reaches a first circumferential position, which is circled in FIG. 2 as the detail X, the conical milling tool 8 is stopped along its circular path and withdrawn axially, i.e. moved out of the component 1 (toward the right in the drawing). Then the conical tool 8 is moved to the first circumferential position from the other side, and this, far enough for the two machined surfaces to produce a line of intersection 7, which is shown in FIG. 3. By stopping the conical tool 8 as it approaches the first circumferential position from its two respective opposite directions the deflecting surfaces 5, 6 are obtained, which are part-surfaces of the cone mantle of the milling head 8b. Thus, the deflecting edge 7 is the intersection line of two cones arranged parallel to one another. During the process described, the tool 8 is moved in such manner that the intersection line or deflecting edge 7 is positioned centrally to a tooth, indexed tooth 4 in FIG. 3.

The three circumferential positions indicated by the arrows P1, P2, P3 in FIG. 1 correspond in each case to the representation in FIG. 3. Thus, in total the end face 2a of the internal teeth 2 has three teeth, separated by circumferential angles of approximately 120 degrees, which have deflecting surfaces 5, 6 and deflecting edges 7. This enables simpler assembly when the counter-component (not shown) with corresponding external teeth is brought in axially. The ends of the external teeth to be fitted—this is not shown—are chamfered, i.e. they are provided with roof-shaped deflecting surfaces. The deflecting surfaces on the external teeth can be produced by methods known from the prior art, for example in accordance with DE 37 21 949 A1 mentioned at the beginning.

Figure 4:
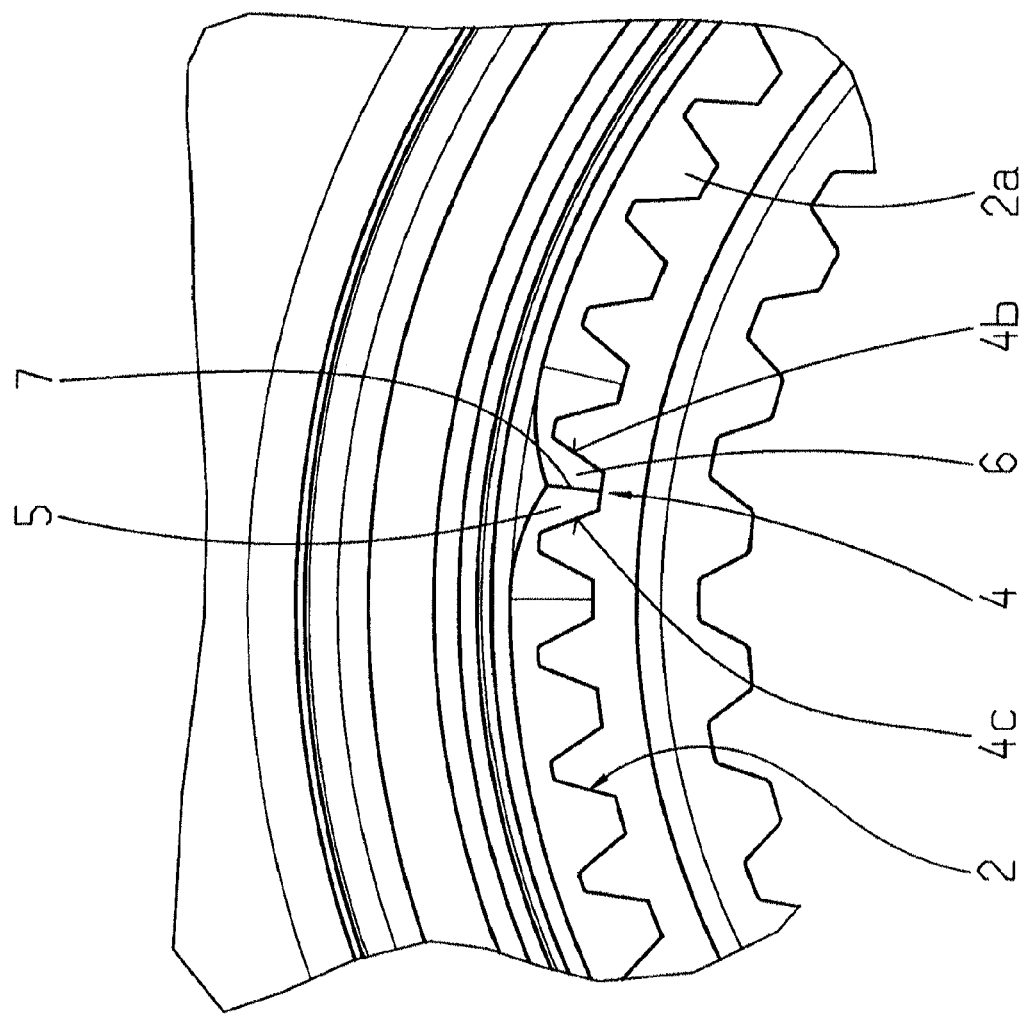

The circumferential position Y indicated by the arrow P1 in FIG. 1 is represented in detail in FIG. 4. Thus, FIG. 4 shows a view in the axial direction toward the end face 2a of the internal gear teeth 2 with deflecting surfaces 5, 6 on either side. As already mentioned, the deflecting surfaces 5, 6 are part-surfaces of the cone mantle of the milling head 8b, and are therefore concave.

Figure 5:
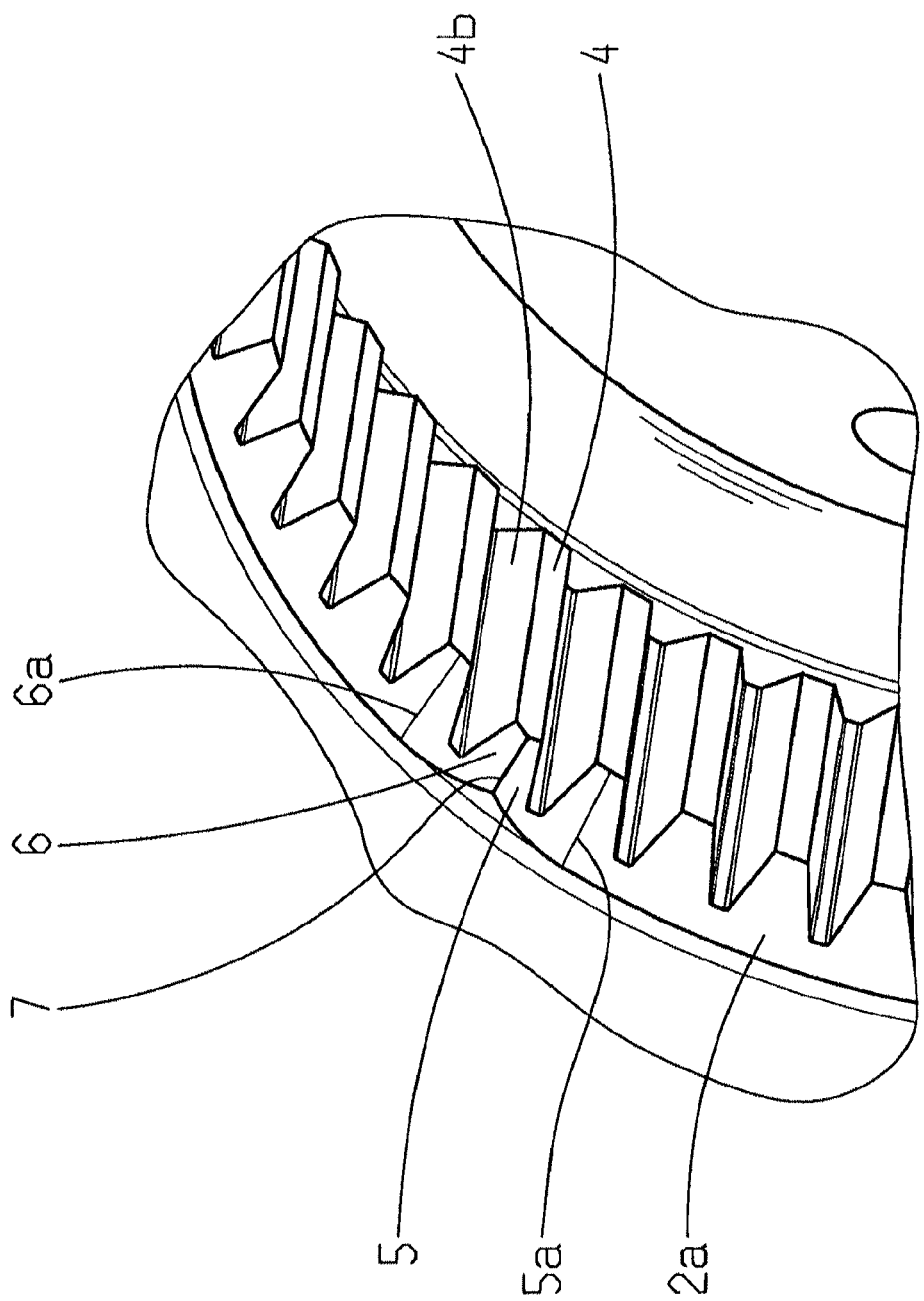

FIG. 5 shows a 3D representation of the internal teeth with deflecting surfaces 5, 6 according to the invention for the tooth 4; the indexes used are the same as in FIG. 3 and FIG. 4. Relative to the conical end face 2a, the concavely shaped deflecting surfaces 5, 6 are delimited by edges 5a, 6a. Thus the edges 5a, 6a, also show the position of the conical milling tool 8 (FIG. 2) in which the movement along the circular path of radius e is stopped and the movement in the axial direction out of the component begins.

INDEXES

1 Component
1a Longitudinal axis
1b Front end
Internal teeth
2a End face
3 Internal teeth
4 Tooth
4a Tooth crown
4b Tooth flank
4c Tooth flank
5 Deflecting surface
6 Deflecting surface
7 Deflecting edge (line of intersection)
8 Conical milling tool
8a Rotation axis
8b Milling head
α Cone angle
e Eccentricity
P1 First circumferential position
P2 Second circumferential position
P3 Third circumferential position

The invention claimed is:

1. A method of producing internal gear teeth (2) with deflecting surfaces (5, 6), the internal gear teeth (2) being arranged in a component (1) having an end (1b) and defining a longitudinal axis (1a), an end face (2a) of the internal gear teeth (2) being axially offset, along the longitudinal axis (1a), relative to the end (1b) of the component (1), the end face (2a) of the internal gear teeth (2) being machined using a conical tool (8) that rotates about a tool axis (8a) which is arranged parallel to the longitudinal axis (1a), and the rotating tool (8) being moved along a circular path coaxial to the longitudinal axis (1a), the method comprising the steps of:

biasing the tool (8) in an axis-parallel direction,
moving the tool (8) along a circular path through a defined circumferential angle until the tool (8) reaches a first circumferential position (P1), and then
withdrawing the tool (8) parallel to the longitudinal axis; and
re-introducing the tool (8) in the axis-parallel direction and subsequently moving the tool (8), from an opposite direction, through a defined circumferential angle to the first circumferential position (P1) such that an intersection edge (7) of the deflecting surfaces (5, 6), produced by machining, being formed on the end face (2a) and being located centrally on a tooth profile (4, 4a, 4b, 4c).

2. The method for producing internal gear teeth (2) according to claim 1, further comprising the step of carrying out the machining by milling of the component (1) with a conical milling cutter (8, 8b).

3. The method for producing internal gear teeth (2) according to claim 2, further comprising the step of forming the internal gear teeth (2) on the component (1), either before or after milling with the conical milling cutter (8).

4. The method for producing internal gear teeth (2) according to claim 1, further comprising the step of forming the internal gear teeth (2) by either a hollowing out or a slotting process.

5. A method of producing internal gear teeth (2) with deflecting surfaces (5, 6) within a cylindrical component (1) that comprises a first axial end (1b) and a longitudinal axis (1a), the internal gear teeth (2) extending axially and having an end face (2a) axially offset from the first axial end (1b) of the cylindrical component (1), the method comprising the steps of:

machining the cylindrical component (1) with a conical end of a tool (8) rotating about a tool axis (8a) that extends parallel to the longitudinal axis (1a) of the component (1);

axially biasing the tool (8), along the tool axis (8a), such that the conical end of the tool (8) contacts the end face (2a) of the internal gear teeth (2);

moving the tool (8) about a circular path through a defined circumferential angle until the tool (8) reaches a first circumferential position (P1);

subsequently axially withdrawing the tool (8), parallel to the longitudinal axis (1a), away from the end face (2a) of the internal gear teeth (2);

axially re-introducing the tool (8), parallel to the longitudinal axis (1a), toward the end face (2a) of the internal gear teeth (2) such that the conical end of the tool (8) contacts the end face (2a) of the internal gear teeth (2);

moving the tool (8) about the circular path through a defined circumferential angle, from an opposite direction, toward and to the first circumferential position (P1) such that an intersection edge (7) of the deflecting surfaces (5, 6) is produced on the end face (2a) by machining by the tool (8), and the intersection edge (7) being located centrally on a tooth profile (4, 4a, 4b, 4c).

\* \* \* \* \*